United States Patent [19]

Schneider

[11] Patent Number: 4,973,994

[45] Date of Patent: Nov. 27, 1990

[54] METHOD AND APPARATUS FOR CONTROLLING ION TRAJECTORY PERTURBATIONS IN IONOGRAPHIC DEVICES

[75] Inventor: Eric J. Schneider, Webster, N.Y.

[73] Assignee: Xerox Corporation, Stamford, Conn.

[21] Appl. No.: 428,714

[22] Filed: Oct. 30, 1989

[51] Int. Cl.[5] ............................................ G01D 15/06

[52] U.S. Cl. ........................................................ 346/159

[58] Field of Search ................. 250/326, 426; 346/159

[56] References Cited

U.S. PATENT DOCUMENTS

| | | | |
|---|---|---|---|
| 4,463,363 | 7/1984 | Gundlach et al. | 346/159 |
| 4,524,371 | 6/1985 | Sheridon et al. | 346/159 |
| 4,538,163 | 8/1985 | Sheridon | 346/155 |
| 4,562,447 | 12/1985 | Tarumi et al. | 346/159 |
| 4,593,994 | 6/1986 | Tamura et al. | 355/35 C |
| 4,644,373 | 2/1987 | Sheriow et al. | 346/159 |
| 4,646,163 | 2/1987 | Tuan et al. | 358/300 |
| 4,675,703 | 6/1987 | Fotland | 346/159 |
| 4,719,481 | 1/1988 | Tuan et al. | 346/159 |
| 4,737,805 | 4/1988 | Weisfield et al. | 346/159 |

*Primary Examiner*—Donald A. Griffin
*Attorney, Agent, or Firm*—Mark Costello

[57] ABSTRACT

In an ionographic device projecting a stream of ions towards a moving imaging surface, modulated in imagewise fashion, an array of control electrodes corresponding to the ion stream modulating array of electrodes, is arranged adjacent to the path of the ion stream and between the source of the modulated ion stream and the imaging surface, biased with a voltage preventing previously deposited charge from perturbing the trajectory of subsequently projected ions to limit the amount of ion beam deflection caused by the presence of electrostatic charge patterns on the electroreceptor. The control electrode voltage increases with the period over which the modulation electrode has allowed the flow of ions therepast.

10 Claims, 3 Drawing Sheets

Figure 1A:
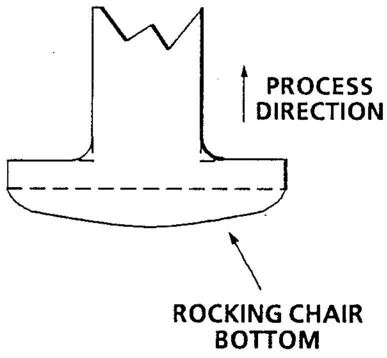

METHOD AND APPARATUS FOR CONTROLLING ION TRAJECTORY PERTURBATIONS IN IONOGRAPHIC DEVICES

The present invention relates generally to controlling ion trajectory perturbations in ionographic devices, and more particularly to controlling ion projection with electrodes interposed between an ion generating device and an imaging surface.

CROSS REFERENCE

Cross reference is made to U.S. patent application Ser. No. 370,317, entitled "METHOD AND APPARATUS FOR CONTROLLING ION TRAJECTORY PERTURBATIONS IN IONOGRAPHIC DEVICES", filed 6/22/89, and assigned to the same assignee as the present application.

INCORPORATION BY REFERENCE

U.S. Pat. No. 4,524,371 to Sheridon et al., U.S. Pat. No. 4,463,363 to Gundlach et al., U.S. Pat. No. 4,538,163 to Sheridon, U.S. Pat. No. 4,644,373 to Sheridan et al., U.S. Pat. No. 4,737,805 to Weisfield et al. U.S. Pat. No. 4,646,163 to Tuan et al. and U.S. Pat. No. 4,719,481 to Tuan et al. are all incorporated by reference

BACKGROUND OF THE INVENTION

In ionographic devices such as that described by U.S. Pat. No. 4,524,371 to Sheridon et al. or U.S. Pat. No. 4,463,363 to Gundlach et al., an ion producing device generates ions to be directed past a plurality of modulation electrodes to an imaging surface in imagewise configuration. In one class of ionographic devices, ions are produced at a coronode supported within an ion chamber, and a moving fluid stream entrains and carries ions produced at the coronode out of the chamber. At the chamber exit, a plurality of control electrodes or nibs are modulated with a control voltage to selectively control passage of ions through the chamber exit. Ions directed through the chamber exit are deposited on a charge retentive surface in imagewise configuration to form an electrostatic latent image developable by electrostatographic techniques for subsequent transfer to a final substrate. The arrangement produces a high resolution non-contact printing system. Other ionographic devices exist which operate similarly, but do not rely on a moving fluid stream to carry ions to a surface.

One problem affecting the control of image quality in ionographic devices is known as "blooming". Blooming is a phenomenon resulting from the effect of previously deposited ions or charge on the path of subsequent ions directed to the charge retentive surface. The problem is particularly noticeable when printing characters and edges of solid areas, resulting in character defects known as "rocking chair bottoms" (FIG. 1A), "undercutting" (FIG. 1B) and "trapezoids" (FIG. 1C), (with input bit maps shown in dashed lines).

U.S. Pat. No. 4,593,994 to Tamura et al. discloses an ion flow modulator for use in a photocopying machine, including a common electrode formed on one major surface of an insulating substrate and a plurality of ion control electrodes formed on the other major surface of the insulating substrate. U.S. Pat. No. 4,562,447 to Tarumi et al. discloses an ion modulating electrode for a recording unit of an electrostatic recording apparatus including one row of apertures capable of enhancing or blocking a passage of ion flow. U.S. patent application Ser. No. 370,317, entitled "METHOD AND APPARATUS FOR CONTROLLING ION TRAJECTORY PERTURBATIONS IN IONOGRAPHIC DEVICES", filed 6/22/89, and assigned to the same assignee as the present application, teaches the use of an electrode extending across the array of modulation electrodes with single bias voltage applied thereto.

SUMMARY OF THE INVENTION

In accordance with the invention, in an ionographic printing system, there is provided a method and apparatus for controlling blooming on the imaging surface, by shaping the electric field in the imaging gap so that the effect of previously deposited charge on the trajectory of subsequently projected ions is minimized.

In accordance with one aspect of the invention, in an ionographic device projecting a modulated stream of ions in imagewise fashion towards a moving imaging surface, an array of control electrodes, each control electrode corresponding to a modulation electrode may be arranged adjacent to the path of the modulated ion stream and between the source of the modulated ion stream and the imaging surface, biased with a voltage signal whose magnitude (amplitude) is dependent on the period over which the modulated ion stream has been allowed to pass through the modulation channel, or during which printing is being accomplished, thereby minimizing the effect of charge previously deposited into the image on the imaging surface on the trajectory of subsequently projected ions, to limit the amount of ion beam deflection caused by the presence of electrostatic charge on the imaging surface.

There is a strong electric field, limited by air breakdown, between the imaging surface and the control electrode, defined by $V_{Electrode}/d$, where $V_{Electrode}$ ($V_E$) is the bias voltage of the control electrode and d is the distance across the air gap from the electrode to the imaging surface. The presence of an image on the electroreceptor can deflect the ion beam only to the point where the electric field created by the control electrode intercepts the ion paths. Thus, the perturbation of the ion trajectory caused by the electric field created by the already deposited ions can be controlled by the potential of the control electrode and the blooming limited. This invention adjusts the potential of the control electrodes individually, to account for the blooming associated with printing by any particular modulation electrode.

Figure 1B:
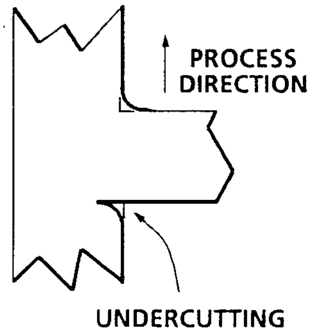
Figure 1C:
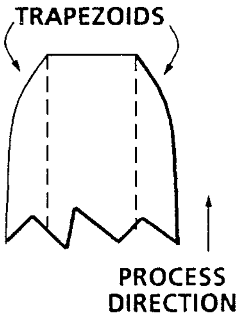
Figure 2:
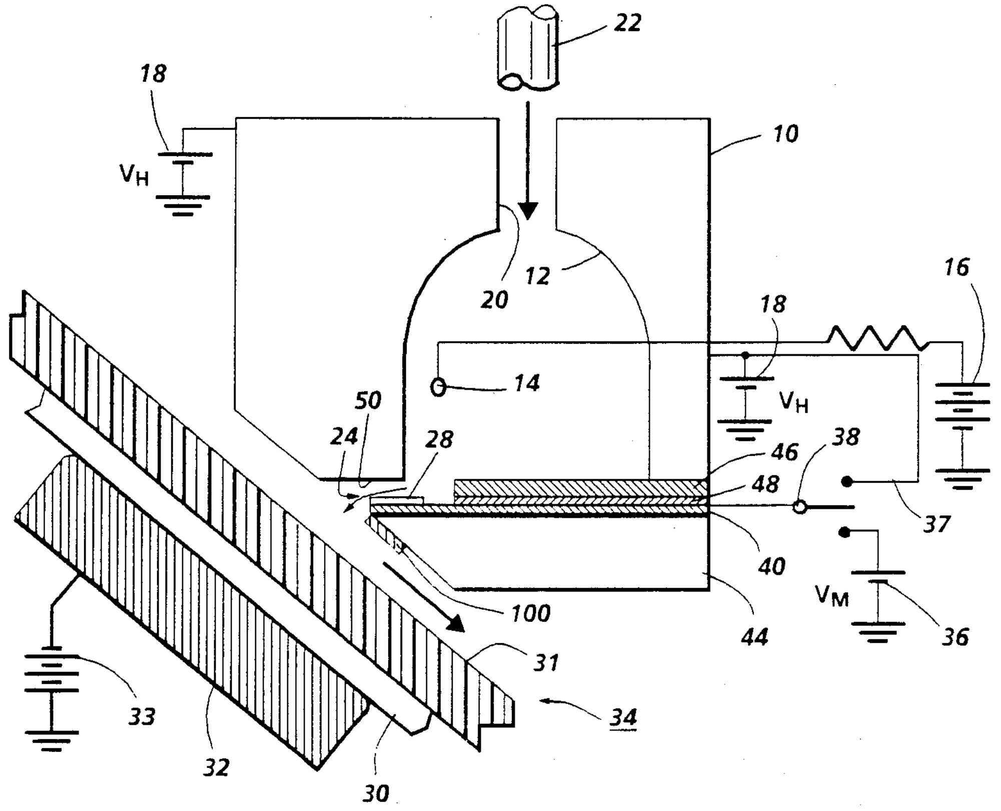
Figure 3:
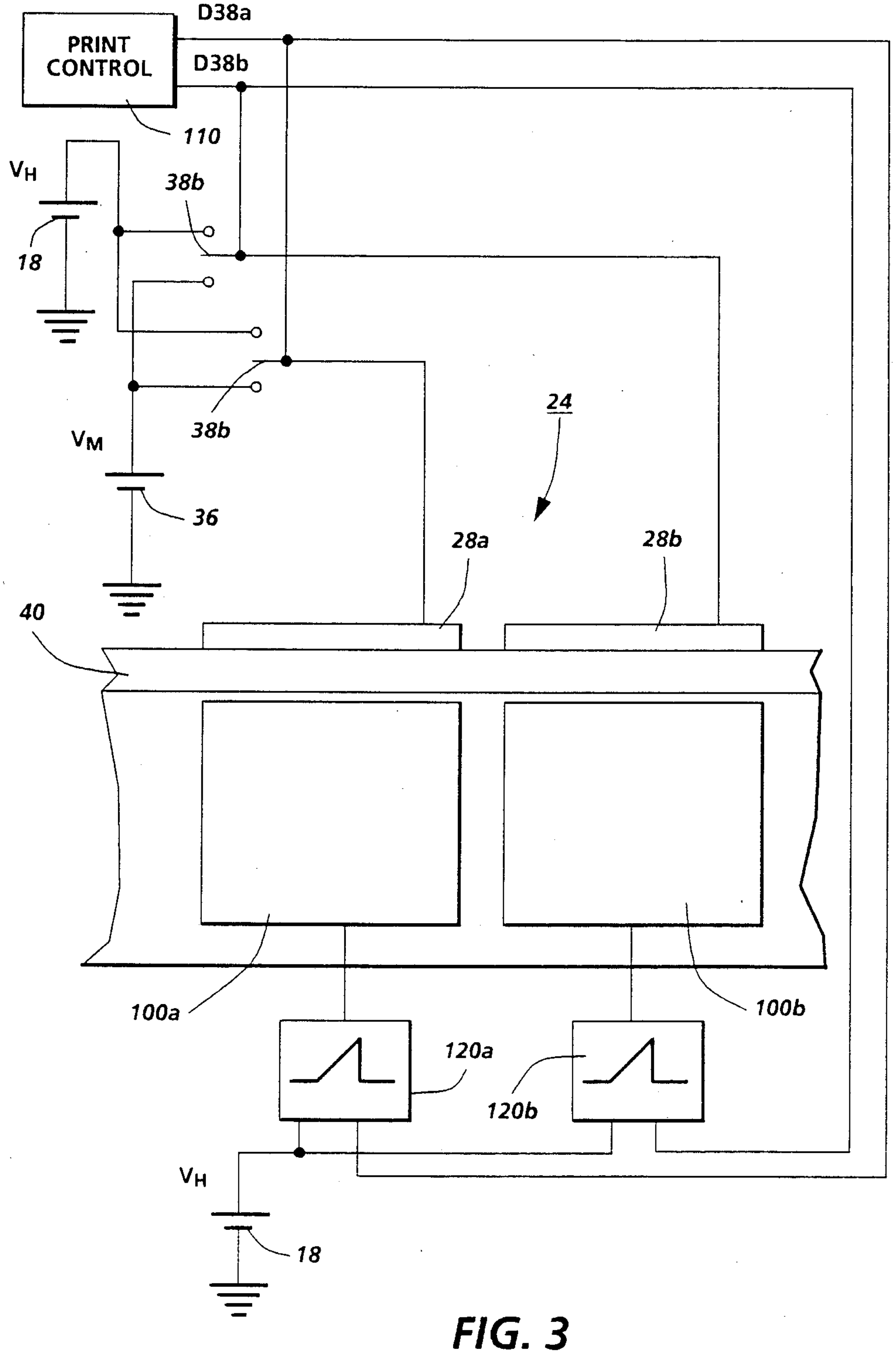
Figure 4:
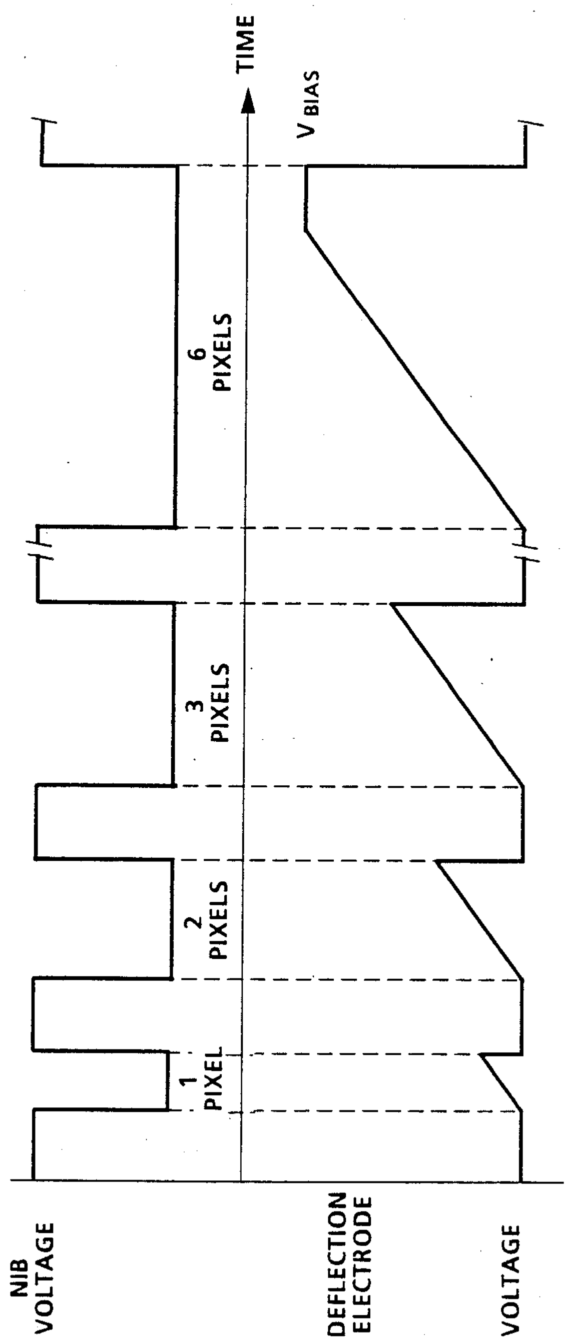

These and other aspects of the invention will become apparent from the following description used to illustrate a preferred embodiment of the invention read in conjunction with the accompanying drawings in which:

FIGS. 1A, 1B, and 1C demonstrate blooming artifacts noted in ionographic printing;

FIG. 2 schematically shows an ionographic print head of the type contemplated for use with the present invention, in printing relationship with an imaging surface;

FIG. 3 shows an embodiment of the invention in an ionographic printing head; and FIG. 4 shows the wave form applied to the modulation electrodes and the corresponding wave form applied to the control electrodes.

With reference now to the drawings where the showings are for the purpose of illustrating an embodiment of the invention and not for limiting same, FIG. 2 shows a schematic representation of a cross section of the marking head 10 of a fluid jet assisted ionographic marking apparatus similar to that described in commonly assigned U.S. Pat. No. 4,644,373 to Sheridan et al.

Within head 10 is an ion generation region including an ion chamber 12, a coronode 14 supported within the chamber, a high potential source 16 $V_C$, on the order of several thousand volts D.C., applied to the coronode 14, and a reference potential source 18, connected to the wall of chamber 12, maintaining the head at a voltage $V_H$. The corona discharge around coronode 14 creates a source of ions of a given polarity (preferably positive), which are attracted to the chamber wall held at $V_H$, and fill the chamber with a space charge.

An inlet channel 20 to ion chamber 12 delivers pressurized transport fluid (preferably air) into chamber 12 from a suitable source, schematically illustrated by tube 22. A modulation channel 24 conducts the transport fluid out of the chamber from ion chamber 12 to the exterior of the head 10. As the transport fluid passes through ion chamber 12, it entrains ions and moves them into modulation channel 24, past modulation electrodes 28. The interior of ion chamber 12 may be provided with a coating that is inert to the highly corrosive corona byproducts produced therein.

Ions allowed to pass out of head 10, through modulation channel 24, and directed to charge receptor 34, come under the influence of a conductive plane 30, provided as a backing layer to a charge receptor dielectric surface 31, with conductive plane 30 slidingly connected via a shoe 32 to a voltage supply 33. Alternatively, a single layer dielectric charge receptor might be provided, passing a biased back electrode to the same effect. Subsequently the latent image charge pattern may be made visible by suitable development apparatus (not shown).

Once ions have been swept into modulation channel 24 by the transport fluid, it becomes necessary to render the ion-laden fluid stream intelligible. This is accomplished by individually switching modulation electrodes 28 in modulation channel 24, between a marking voltage source 36 and a reference potential 37 by means of a switch 38. While the switching arrangement shown produces a binary imaging function, grey levels may be provided by providing a continuously variable voltage signal to the modulation electrodes. The modulation electrodes are arranged on a thin film layer 40 supported on a planar insulating substrate 44 between the substrate and a conductive plate 46, and insulated from the conductive plate by an insulating layer 48.

Modulation electrodes 28 and the opposite wall 50, held at $V_H$, comprise a capacitor, across which the voltage potential of source 36, may be applied, when connected through switch 38. Thus, an electric field, extending in a direction transverse to the direction of the transport fluid flow, is selectively established between a given modulation electrode 28 and the opposite wall 50.

"Writing" of a selected spot is accomplished by connecting a modulation electrode to the reference potential source 37, held at $V_H$, so that the ion "beam", passing between the electrode and its opposite wall, will not be under the influence of a field therebetween and transport fluid exiting from the ion projector, in that "beam" zone, will carry the "writing" ions to accumulate on the desired spot of the image receptor sheet. Conversely, no "writing" will be effected when the modulation voltage is applied to an electrode. This is accomplished by connecting the modulation electrode 28 to the low voltage potential of source 36 via switch 38 so as to impose upon the electrode a charge of the same sign as the ionic species. The ion "beam" will be repelled and be driven into contact with the opposite, conductive wall 50 where the ions neutralize into uncharged, or neutral air molecules. Thus, an imagewise pattern of information is formed by selectively controlling each of the modulation electrodes on the marking array so that the ion "beams" associated therewith either exit or are inhibited from exiting the housing, as desired. For simplicity and economy of fabrication over the large area, full pagewidth head, thin film techniques are used. Thin film silicon, in either the amorphous, polycrystalline or microcrystalline forms, has been the material of choice for the active devices. The relatively low temperature of the amorphous silicon and polysilicon fabrication processes allows a large degree of freedom in the choice of substrate materials, enabling the use of inexpensive amorphous materials such as glass, ceramics and possibly some printed circuit board materials.

As an alternative to an ionographic printing head with fluid jet assisted ion flow, it will no doubt be appreciated that other ionographic print heads may be provided where the the ion stream could be field directed to the charge receptor. Further, while the description herein assumes positive ions, appropriate changes may be made so that negative ions may be used.

In accordance with the invention, and as shown in FIGS. 2 and 3, an array of control electrodes 100, supported on an insulative support 102, are interposed between the printing head 10 and charge receptor 34, adjacent to the writing position, and extending across charge receptor 34, transverse to the direction of movement thereof, to limit the amount of ion beam deflection caused by the presence of electrostatic charge on the electroreceptor. FIG. 3 shows a configuration with two of a series conductive electrodes 100*a* and 100*b*, biased as will be further described with a voltage $V_E$. There is a strong electric field between the charge receptor and the control electrode, $V_E/d$, where d is the distance across the air gap to control electrode 100 from charge receptor 34, limited by air breakdown. However, as charge is deposited by the ion beam, the presence of an image on the charge receptor can deflect the ion beam only to the point where the control electrode intercepts the ion paths. Thus, the perturbation of the ion trajectory caused by the electric field created by the already deposited ions can be controlled by the potential of the control electrode and the blooming limited.

To provide optimum control over blooming in the process direction, the bias on the individual control electrodes is controlled based on the amount of blooming expected. With reference to FIG. 3, control electrodes 100 are normally biased with a voltage of $V_H$. With such a bias, ions directed through the modulation channel 24 for deposit on charge receptor 34 reach that surface without effect from the control electrodes.

In the situation where blooming is likely to occur, primarily in the case of previously deposited ions for solid area coverage, the print data controlling the operation of switches 38*a* and 38*b* from print control 110 is also directed to ramping circuit 120*a* and 120*b*, in turn connected to control electrodes 100*a* and 100*b*. These circuits provide a ramping voltage signal that rises over the pixel ON period. If the next pixel printed is also ON, then the ramping voltage continues. Otherwise the voltage drops to $V_H$. Because the blooming effect is the cumulative sum of the electrostatic forces of ions previously deposited, an increasing electric field at the control electrode, and the thus an increasing control electrode bias is required to correct for the blooming effect. Practically, however, blooming only has a displacement effect of approximately 1–5 pixels. Accordingly, if the ON period is longer than about 5 pixels, the ramp value may remain at a selected maximum value. FIG. 4 shows the relative signals to the modulation electrodes and the corresponding control electrodes over a series of pixel periods up to three pixels.

Values of $V_E$ may reasonably be expected to be in the range of 0 to 500 V where $V_H$ is also equal to about 1000 volts and $V_C$ is several thousand volts. Such values are highly dependent on the charge receptor to head spacing, and may vary considerably with different head configurations. While the ramping function described and shown in FIG. 4 is linear, non-linear functions including asympotic functions may also be used to control the ramping voltage. Polarity is selected so that the ion is biased towards the image.

Control electrodes 100 may be fabricated in a number of ways, including, for simplicity and economy of fabrication over the large area, full page-width head, thin film techniques similar to that proposed for the modulation electrodes.

The invention has been described with reference to a preferred embodiment. Obviously modifications will occur to others upon reading and understanding the specification taken together with the drawings. Various alternatives, modifications, variations or improvements may be made by those skilled in the art from this teaching which is intended to be encompassed by the following claims.

I claim:

1. In an ionographic imaging device, including a source of ions, means for moving ions in a stream towards a moving imaging surface to create a pattern of charge thereon, an array of modulation electrodes individually biased to modulate the ion stream flowing therepast in imagewise fashion for the formation of intelligible charge patterns on the imaging surface, means to develop the charge pattern on the imaging surface, and means for controlling the stream of ions projected towards the imaging surface to prevent charge previously deposited on the imaging surface from affecting the path of the modulated stream of ions to the imaging surface, the control means comprising:

an array of control electrodes, supported adjacent the ion stream path, and between the modulating means and the imaging surface, each said electrode corresponding to a modulation electrode; and control electrode biasing means for applying a voltage to each control electrode to offset the effect on the ion stream of charge previously deposited on the imaging surface.

2. In an ionographic imaging device, including a source of ions, means for moving ions in a stream towards a moving imaging surface to create a pattern of charge thereon, an array of modulation electrodes individually biased to modulate the ion stream flowing therepast in imagewise fashion for the formation of intelligible charge patterns on the imaging surface, means to develop the charge pattern on the imaging surface, and means for controlling the stream of ions projected towards the imaging surface to prevent charge previously deposited on the imaging surface from affecting the path of the modulated stream of ions to the imaging surface, the control means comprising:

an array of control electrodes, supported adjacent the ion stream path, and between the modulating means and the imaging surface, each said electrode corresponding to a modulation electrode; and control electrode biasing means for applying a voltage to each control electrode to offset the effect on the ion stream of charge previously deposited on the imaging surface;

the voltage applied to each control electrode varying with the period over which the corresponding modulation electrode has been biased to allow flow of the ion stream therepast.

3. The device as defined in claim 2, wherein the voltage applied to each control electrode increases linearly with the period over which the corresponding modulation electrode has been biased to allow flow of the ion stream therepast.

4. In an ionographic imaging device, including a source of ions, means for moving ions in a stream towards a moving imaging surface to create a pattern of charge thereon, an array of modulation electrodes individually biased to modulate the ion stream flowing therepast in imagewise fashion for the formation of intelligible charge patterns on the imaging surface, means to develop the charge pattern on the imaging surface, and means for controlling the stream of ions projected towards the imaging surface to prevent charge previously deposited on the imaging surface from affecting the path of the modulated stream of ions to the imaging surface, the control means comprising:

an array of control electrodes, supported adjacent the ion stream path, each control electrode positioned downstream along the path of the modulated stream of ions from a corresponding modulation electrode; and a control electrode biasing arrangement providing a first voltage signal to each control electrode when the corresponding modulation electrode is in a non-printing modulation condition, and providing a varying second voltage signal to the each control electrode when the corresponding modulation electrode is allowing the flow of the ion stream therepast, with the second voltage signal varying with the period over which the corresponding modulation electrode is in the condition of allowing the the flow of the ion stream therepast

5. The device as defined in claim 4, wherein the voltage applied to each control electrode increases with the period over which the corresponding modulation electrode is in the condition of allowing the flow of the ion stream therepast.

6. The device as defined in claim 5, wherein the voltage applied to each control electrode increases linearly with the period over which the corresponding modulation electrode is in the condition of allowing the flow of the ion stream therepast.

7. An ionographic imaging device comprising:

a body having an ion chamber formed therein, and including an inlet passage to the chamber and a outlet passage from the chamber;

a source of ions supported within said chamber;

a fluid jet source, supplying a moving stream of fluid through said inlet, past said ion source, and entraining ions produced thereat to be carried through said outlet passage;

a moving charge retentive imaging surface, passing adjacent said outlet passage for receiving ions to create a pattern of charge thereon;

an array of modulation electrodes arranged at said outlet passage generally transversely across the path of the moving stream of fluid, and individually biasable to modulate the ion stream flowing therepast in imagewise fashion for the formation of intelligible charge patterns on the imaging surface;

an array of control electrodes, supported adjacent the ion stream path, each control electrode positioned downstream along the path of the modulated ion stream from a corresponding modulation electrode; and a control electrode biasing arrangement providing a first voltage signal to each control electrode when the corresponding modulation electrode is in a non-printing condition, and providing a second voltage signal to the each control electrode when the corresponding modulation electrode is allowing the flow of the ion stream therepast whereby the control electrode bias offsets the effect of previously deposited charge on the imaging surface on the modulated ion stream.

8. An ionographic imaging device comprising:

a body having an ion chamber formed therein, and including an inlet passage to the chamber and an outlet passage from the chamber;

a source of ions supported within said chamber;

a fluid jet source, supplying a moving stream of fluid through said inlet, past said ion source, and entraining ions produced thereat to be carried through said outlet passage;

a moving charge retentive imaging surface, passing adjacent said outlet passage for receiving ions to create a pattern of charge thereon;

an array of modulation electrodes arranged at said outlet passage generally transversely across the path of the moving stream of fluid, and individually biasable to modulate the ion stream flowing therepast in imagewise fashion for the formation of intelligible charge patterns on the imaging surface;

an array of control electrodes, supported adjacent the ion stream path, each control electrode positioned downstream along the path of the modulated ion stream from a corresponding modulation electrode; and a control electrode biasing arrangement providing a first voltage signal to each control electrode when the corresponding modulation electrode is in a non-printing condition, and providing a second voltage signal to each control electrode when the corresponding modulation electrode is allowing the flow of the ion stream therepast whereby the control electrode bias offsets the effect of previously deposited charge on the imaging surface on the modulated ion stream;

the voltage applied to each control electrode increasing linearly with the period over which the corresponding modulation electrode is in the condition of allowing the flow of the ion stream therepast.

9. An ionographic imaging device comprising:

a body having an ion chamber formed therein, and including an inlet passage to the chamber and an outlet passage from the chamber;

a source of ions supported within said chamber;

a fluid jet source, supplying a moving stream of fluid through said inlet, past said ion source, and entraining ions produced thereat to be carried through said outlet passage;

a moving charge retentive imaging surface, passing adjacent said outlet passage for receiving ions to create a pattern of charge thereon;

an array of modulation electrodes arranged at said outlet passage generally transversely across the path of the moving stream of fluid, and individually biasable to modulate the ion stream flowing therepast in imagewise fashion for the formation of intelligible charge patterns on the imaging surface;

an array of control electrodes, supported adjacent the ion stream path, each control electrode positioned downstream along the path of the modulated ion stream from a corresponding modulation electrode; and a control electrode biasing arrangement providing a first voltage signal to each control electrode when the corresponding modulation electrode is in a non-printing condition, and providing a second voltage signal to each control electrode when the corresponding modulation electrode is allowing the flow of the ion stream therepast whereby the control electrode bias offsets the effect of previously deposited charge on the imaging surface on the modulated ion stream;

the voltage applied to each control electrode increasing with the period over which the corresponding modulation electrode is in the condition of allowing the flow of the ion stream therepast.

10. In an ionographic imaging device of the type including including a source of ions, means for moving ions in a stream towards a moving imaging surface to create a pattern of charge thereon, an array of modulation electrodes individually biased to modulate the ion stream flowing therepast in imagewise fashion for the formation of intelligible charge patterns on the imaging surface, means to develop the charge pattern on the imaging surface, a method of controlling the stream of ions projected towards the imaging surface to limit the effect of charge previously deposited on the imaging surface on the path of the modulated stream of ions to the imaging surface, including the steps:

providing an array of individually biasable control electrodes arranged adjacent the path of the modulated the stream of ions:

biasing said control electrodes with a first voltage signal to each control electrode when the corresponding modulation electrode is in a non-printing modulation condition;

biasing said control electrodes with a second voltage signal to each control electrode when the corresponding modulation electrode is allowing the flow of the ion stream therepast; and increasing the magnitude of said second voltage signal to each control electrode in accordance with the period over which the corresponding modulation electrode is allowing the flow of the ion stream therepast.

* * * * *